US009924380B2

(12) United States Patent
Uchino et al.

(10) Patent No.: US 9,924,380 B2
(45) Date of Patent: Mar. 20, 2018

(54) MOBILE COMMUNICATION METHOD

(71) Applicant: NTT DOCOMO, INC., Tokyo (JP)

(72) Inventors: Tooru Uchino, Tokyo (JP); Yoshihisa Kishiyama, Tokyo (JP); Lan Chen, Beijing (CN); Liu Liu, Beijing (CN); Lihui Wang, Beijing (CN); Yong Li, Beijing (CN); Wenbo Wang, Beijing (CN)

(73) Assignee: NTT DOCOMO, INC., Tokyo (JP)

( * ) Notice: Subject to any disclaimer, the term of this patent is extended or adjusted under 35 U.S.C. 154(b) by 117 days.

(21) Appl. No.: 14/913,042

(22) PCT Filed: Aug. 15, 2014

(86) PCT No.: PCT/JP2014/071495
§ 371 (c)(1),
(2) Date: Feb. 19, 2016

(87) PCT Pub. No.: WO2015/025804
PCT Pub. Date: Feb. 26, 2015

(65) Prior Publication Data
US 2016/0205602 A1    Jul. 14, 2016

(30) Foreign Application Priority Data
Aug. 20, 2013  (JP) .................. 2013-170318

(51) Int. Cl.
*H04W 16/32*   (2009.01)
*H04W 24/10*   (2009.01)
(Continued)

(52) U.S. Cl.
CPC .......... *H04W 16/32* (2013.01); *H04W 24/10* (2013.01); *H04W 36/02* (2013.01); *H04W 36/08* (2013.01);
(Continued)

(58) Field of Classification Search
CPC ..... H04W 16/32; H04W 24/10; H04W 36/02; H04W 36/08; H04W 36/28; H04W 74/0833; H04W 36/04; H04W 84/047
See application file for complete search history.

(56) References Cited

U.S. PATENT DOCUMENTS

2012/0329448 A1* 12/2012 Lim .................. H04W 92/20
                                                      455/422.1
2013/0065600 A1*  3/2013 Lim .................. H04W 36/0066
                                                      455/450
(Continued)

FOREIGN PATENT DOCUMENTS

JP        2011-176722 A       9/2011

OTHER PUBLICATIONS

International Search Report issued in PCT/JP2014/071495 dated Oct. 14, 2014 (1 page).
(Continued)

*Primary Examiner* — Jae Y Lee
(74) *Attorney, Agent, or Firm* — Osha Liang LLP

(57) ABSTRACT

In switching a radio base station (SeNB) from a radio base station (SeNB#1) to a radio base station (SeNB#2) in an "Inter-node UP aggregation", forwarding of new downlink data destined for a mobile station (UE) from a radio base station (MeNB) to the radio base station (SeNB#2) is quickly started. A mobile communication method according to the present invention includes: sending, by the mobile station UE, the radio base station (MeNB) a "New data delivery request" that requests forwarding of new downlink data destined for the mobile station (UE) to the radio base station (SeNB#2), in response to an "SeNB change command"; and forwarding, by the radio base station MeNB, the
(Continued)

new downlink data destined for the mobile station (UE) to the radio base station (SeNB#2), in response to the "New data delivery request".

3 Claims, 10 Drawing Sheets

(51) Int. Cl.
*H04W 36/08* (2009.01)
*H04W 74/08* (2009.01)
*H04W 36/02* (2009.01)
*H04W 36/28* (2009.01)
*H04W 36/04* (2009.01)
*H04W 84/04* (2009.01)

(52) U.S. Cl.
CPC ....... *H04W 36/28* (2013.01); *H04W 74/0833* (2013.01); *H04W 36/04* (2013.01); *H04W 84/047* (2013.01)

(56) References Cited

U.S. PATENT DOCUMENTS

2015/0043435 A1\* 2/2015 Blankenship ......... H04L 69/322
370/329
2016/0021581 A1\* 1/2016 Deenoo ............ H04W 36/0055
370/331

OTHER PUBLICATIONS

Written Opinion of the International Searching Authority issued in PCT/JP2014/071495 dated Oct. 14, 2014 (4 pages).
MediaTek Inc.; "Performance of Control Plane Diversity"; 3GPP TSG-RAN2 #83 Meeting, R2-132469; Barcelona, Spain; Aug. 19-23, 2013 (9 pages).
NEC Corporation; "Small Cell enhancement Eutran interfaces"; 3GPP TSG RAN2 Meeting #83, R2-132677; Barcelona, Spain; Aug. 19-23, 2013 (5 pages).
Huawei, HiSilicon; "Throughput results for inter-frequency deployment of small cells"; 3GPP TSG-RAN WG2 Meeting #82, R2-131782; Fukuoka, Japan; May 20-24, 2013 (5 pages).

\* cited by examiner

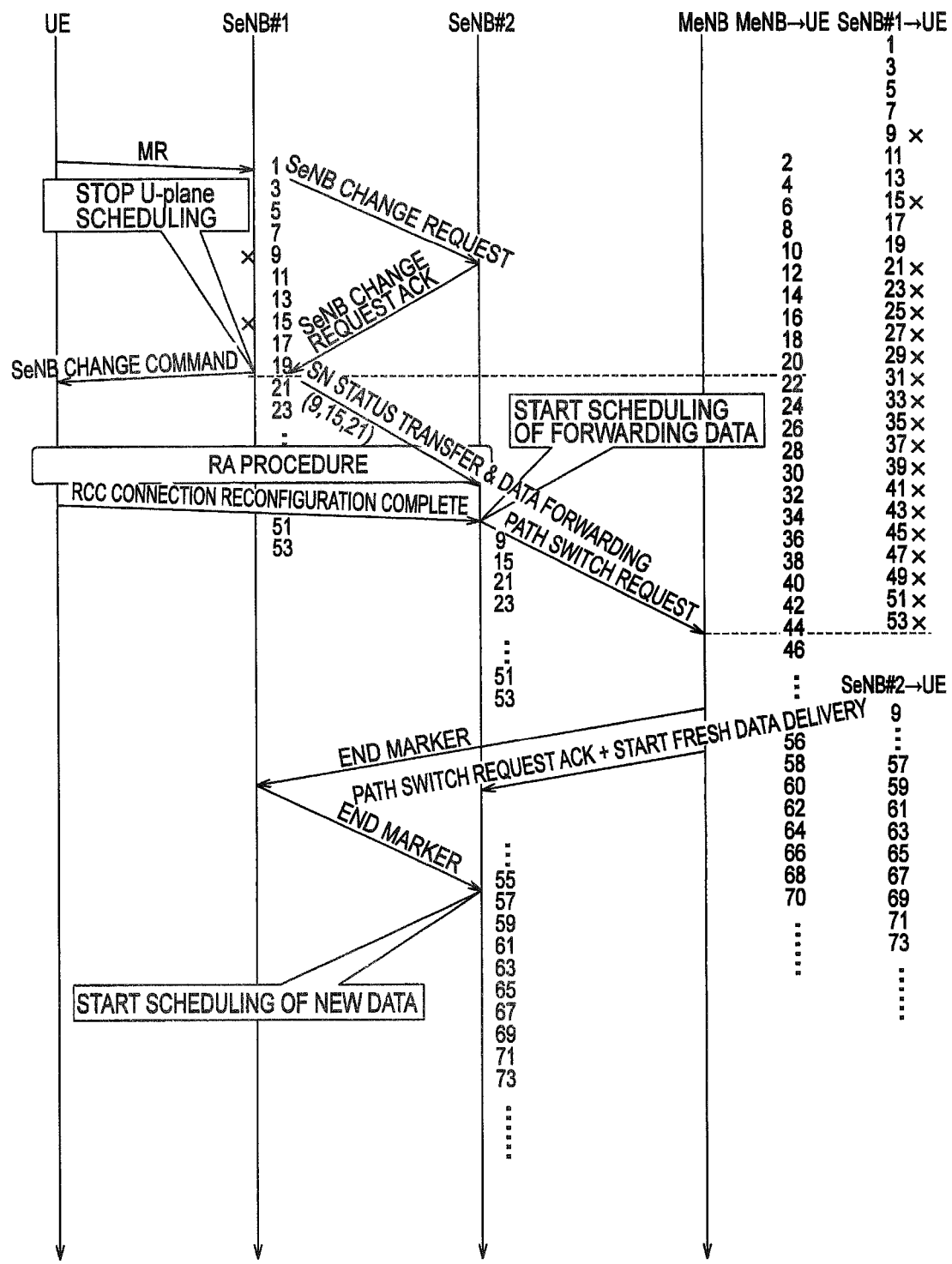

MOBILE COMMUNICATION METHOD

TECHNICAL FIELD

The present invention relates to a mobile communication method.

BACKGROUND ART

In LTE (Long Term Evolution), a handover control is specified in order that a mobile station UE can perform communications in an optimal cell even when the mobile station UE moves (see FIG. 6).

Moreover, CA (Carrier Aggregation) specified until LTE Release-10 is able to achieve the high throughput by performing simultaneous communication using a CC (Component Carrier) #1 and a CC#2 under the same radio base station eNB, as illustrated in FIG. 7(a).

Meanwhile, in LTE Release-12, discussed is "Inter-node UP aggregation" to which the CA until LTE Release-10 is further extended. The "Inter-node UP aggregation" achieves high throughput by performing simultaneous communication using a CC#1 and a CC#2 respectively under different radio base stations eNB#1 and eNB#2, as illustrated in FIG. 7(b) (see Non-patent document 1).

For example, if all the CCs cannot be accommodated in a single radio base station eNB, it is necessary to perform the "Inter-node UP aggregation" in order to achieve the throughput comparable to that of LTE Release-10.

Further, in the "Inter-node UP aggregation", an anchoring node is expected to distribute downlink data to transmit the downlink data to a mobile station UE.

For example, a radio base station MeNB that manages a macro cell is an anchoring node in an example of FIG. 8(a) and a gateway device S-GW is an anchoring node in an example of FIG. 8(b).

PRIOR ART DOCUMENT

Non-Patent Document

Non-patent document 1: 3GPP TDocs (written contribution) R2-131782

SUMMARY OF THE INVENTION

In one conceivable way of "Inter-node UP aggregation", an existing handover control may be applied in order to switch a radio base station SeNB managing a small cell. However, as illustrated in FIG. 9, low-speed lines such as xDSLs are supposed to be used as backhaul lines between the radio base station MeNB and the radio base stations SeNB.

This may consequently increase time periods such as a time period until the radio base station MeNB receives a "Path switch request", and a time period until radio base station MeNB transmits a "Path switch request ack" to the switching-target radio base station SeNB#2, as illustrated in FIG. 10. Accordingly, there has been a problem of a delay of the start of forwarding of new downlink data destined for the mobile station UE from the radio base station MeNB to the radio base station SeNB#2.

Therefore, the present invention has made in view of the problem described above, and an objective thereof is to provide a mobile communication method capable of, in switching a radio base station SeNB from a radio base station SeNB#1 to another radio base station SeNB#2, quickly starting to forward new downlink data destined for a mobile station UE from a macro-cell radio base station MeNB to the other radio base station SeNB#2.

A first feature of the present invention is summarized as a mobile communication method to be executed when a mobile station performs carrier aggregation using a macro cell under a macro-cell radio base station and a small cell under a first small-cell radio base station, the method including: sending, by the first small-cell radio base station, a second small-cell radio base station a switching request that requests small-cell radio base station switching, when receiving a measurement report from the mobile station; stopping, by the first small-cell radio base, scheduling of downlink data destined for the mobile station, and sending the mobile station a switching instruction instructing the small-cell radio base station switching, when receiving a switching request response from the second small-cell radio base station; sending, by the mobile station, the macro-cell radio base station a forwarding request that requests forwarding of new downlink data destined for the mobile station to the second small-cell radio base station, in response to the switching instruction; and forwarding, by the macro-cell radio base station, the new downlink data destined for the mobile station to the second small-cell radio base station, in response to the forwarding request.

A second feature of the present invention is summarized as a mobile communication method to be executed when a mobile station performs carrier aggregation using a macro cell under a macro-cell radio base station and a small cell under a first small-cell radio base station, the method including: sending, by the first small-cell radio base station, a second small-cell radio base station a switching request that requests small-cell radio base station switching, when receiving a measurement report from the mobile station; stopping, by the first small-cell radio base station, scheduling of downlink data destined for the mobile station, and sending the mobile station a switching instruction instructing the small-cell radio base station switching, when receiving a switching request response from the second small-cell radio base station; performing, by the mobile station, a random access procedure with the second small-cell radio base station in response to the switching instruction; sending, by the mobile station, the macro-cell radio base station a forwarding request that requests forwarding of new downlink data destined for the mobile station to the second small-cell radio base station, when the random access procedure is completed; and forwarding, by the macro-cell radio base station, the new downlink data destined for the mobile station to the second small-cell radio base station, in response to the forwarding request.

A third feature of the present invention is summarized as a mobile communication method to be executed when a mobile station performs carrier aggregation using a macro cell under a macro-cell radio base station and a small cell under a first small-cell radio base station, the method including: sending, by the first small-cell radio base station, a second small-cell radio base station a switching request that requests small-cell radio base station switching, when receiving a measurement report from the mobile station; stopping, by the first small-cell radio base station, scheduling of downlink data destined for the mobile station, and sending the mobile station a switching instruction instructing the small-cell radio base station switching, when receiving a switching request response from the second small-cell radio base station; sending, by the mobile station, a connection reconfiguration complete message to the second small-cell radio base station, after receiving the switching instruction; sending, by the mobile station, the macro-cell radio base station a forwarding request that requests forwarding of new downlink data destined for the mobile station to the second small-cell radio base station, when completing the transmission of the connection reconfiguration complete message; and forwarding, by the macro-cell radio base station, the new downlink data destined for the mobile station to the second small-cell radio base station, in response to the forwarding request.

BRIEF DESCRIPTION OF THE DRAWINGS

FIG. 10 is a diagram for explaining handover control processing in the "Inter-node UP aggregation".

DETAILED DESCRIPTION (Mobile Communication System According to First Embodiment of the Present Invention)

A mobile communication system according to a first embodiment of the present invention is described with reference to FIGS. 1 to 5.

Figure 1:
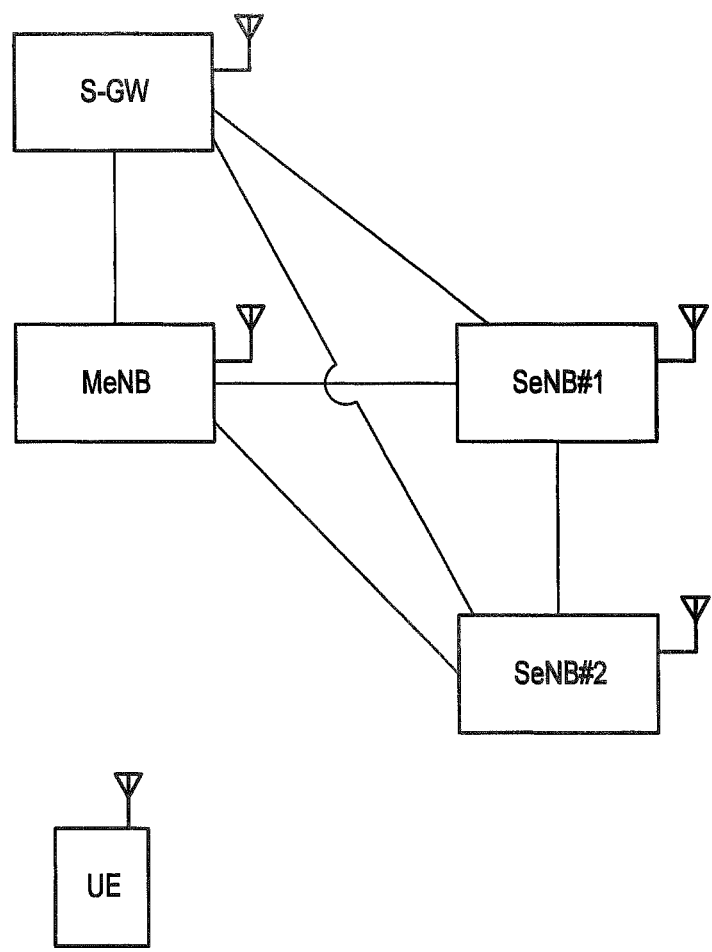
FIG. 1 is an overall configuration diagram of a mobile communication system according to a first embodiment of the present invention.

As illustrated in FIG. 1, the mobile communication system according to the present embodiment is a mobile communication system of LTE, and includes a gateway device S-GW, a radio base station MeNB that manages a macro cell, a radio base station SeNB#1 that manages a small cell #1, a radio base station SeNB#2 that manages a small cell #2, and a mobile station UE.

In the mobile communication system according to the present embodiment, the mobile station UE is configured to be capable of performing CA using a CC under the radio base station MeNB and a CC under the radio base station SeNB#1 (or, a CC under the radio base station SeNB#2).

In other words, the mobile communication system according to the present embodiment is configured to be capable of performing the "Inter-node UP aggregation".

Moreover, the mobile communication system according to the present embodiment may be configured such that in a state where the mobile station UE performs the "Inter-node UP aggregation" with the radio base station MeNB and the radio base station SeNB#1, the radio base station MeNB buffers entire downlink data to be transmitted via the radio base station SeNB#1 to the mobile station UE.

In other words, in this state, the radio base station MeNB is an anchoring node, and may be configured to forward a copy of the above-described downlink data to the radio base station SeNB#1.

Figure 2:
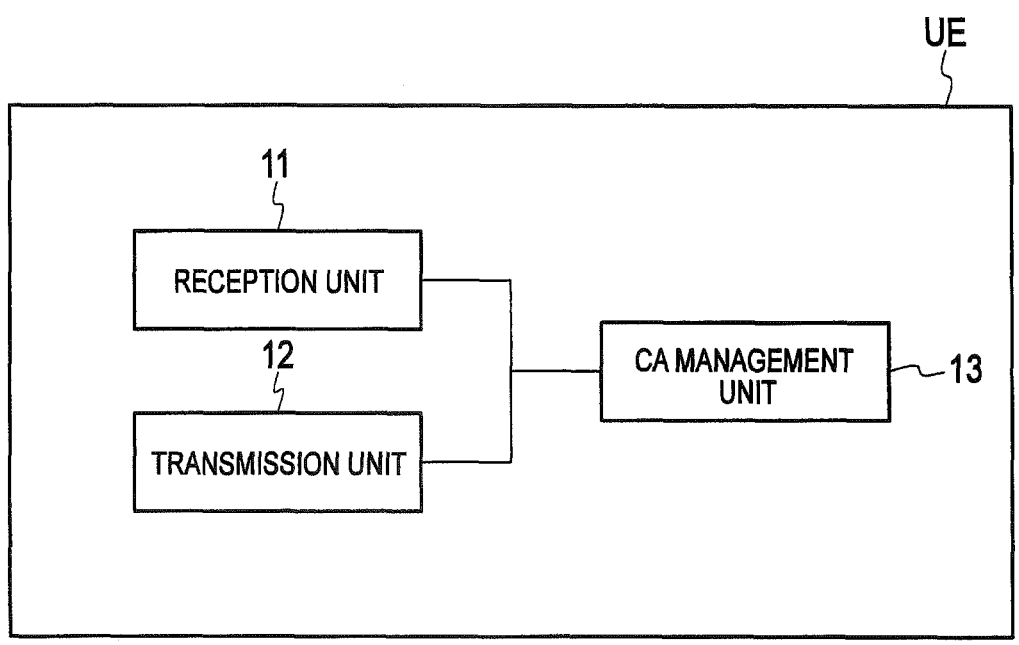
FIG. 2 is a function block diagram of a mobile station according to the first embodiment of the present invention.

As illustrated in FIG. 2, the mobile station UE according to the present embodiment includes a reception unit 11, a transmission unit 12, and a CA management unit 13.

The reception unit 11 is configured to receive various signals transmitted by the radio base station MeNB, the radio base station SeNB#1, and the radio base station SeNB#2. The transmission unit 12 is configured to transmit various signals to the radio base station MeNB, the radio base station SeNB#1, and the radio base station SeNB#2.

The CA management unit 13 is configured to perform control and management for the above-described CA, in other words, the "Inter-node UP aggregation", in cooperation with the reception unit 11 and the transmission unit 12.

Hereinafter, an operation of the mobile communication system according to the present embodiment is described with reference to FIGS. 3 to 5. Specifically, with reference to FIGS. 3 to 5, description is provided for an operation of switching a radio base station SeNB that manages a small cell from the radio base station SeNB#1 to the radio base station SeNB#2 when the "Inter-node UP aggregation" is performed in the mobile communication system according to the present embodiment.

Figure 3:
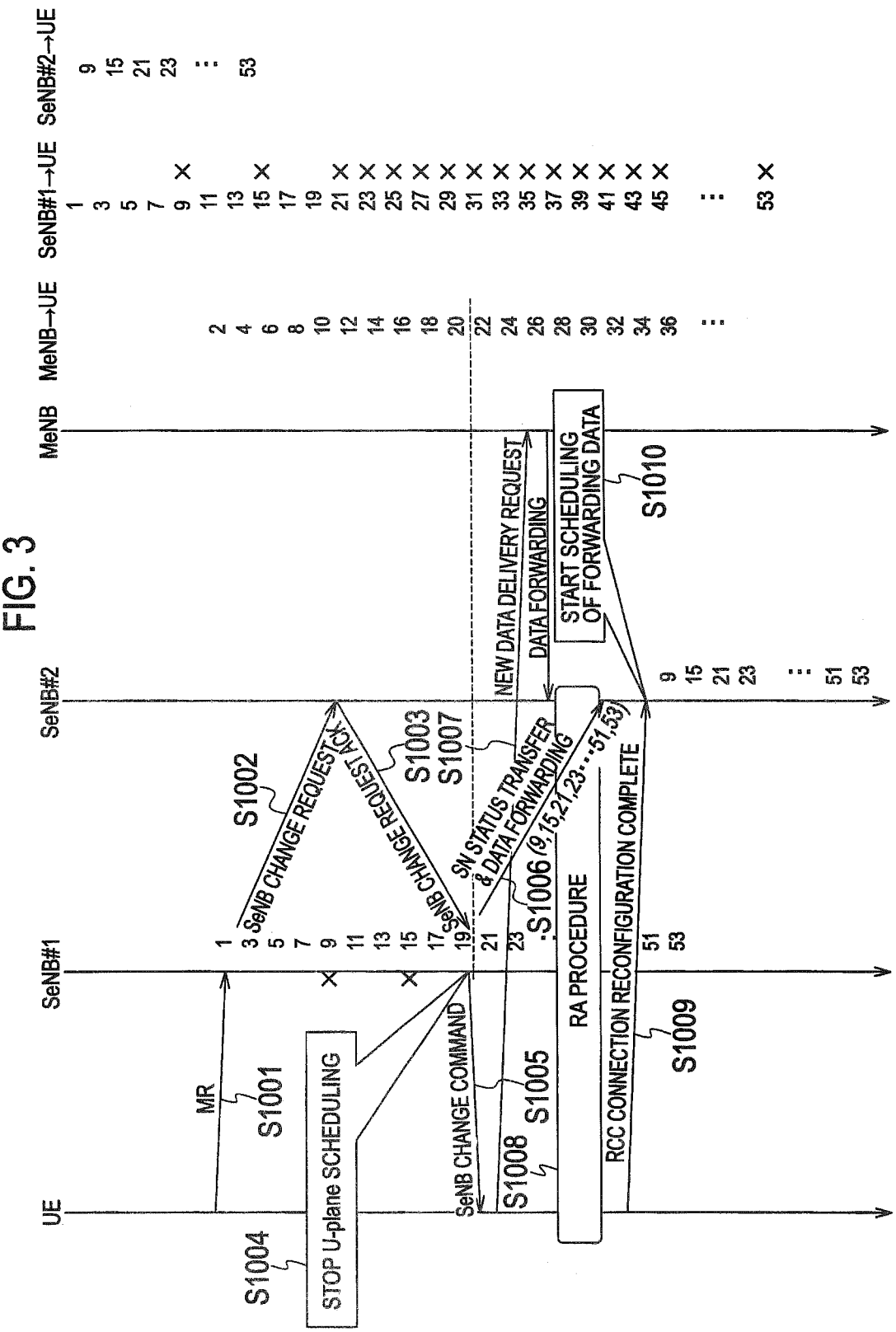
FIG. 3 is a sequence diagram illustrating an example of an operation (operation example 1) by the mobile communication system according to the first embodiment of the present invention.

Firstly, with reference to FIG. 3, an operation example 1 of the mobile communication system according to the present embodiment is described.

As illustrated in FIG. 3, the radio base station SeNB#1 receives a "Measurement Report" from the mobile station UE at Step S1001, and when determining to switch the radio base station SeNB from the radio base station SeNB#1 to the radio base station SeNB#2, sends the radio base station SeNB#2 an "SeNB change request" that requests switching of the radio base station SeNB at Step S1002.

Thereafter, upon receiving an "SeNB change request ack" from the radio base station SeNB#2 at Step S1003, the radio base station SeNB#1 stops scheduling of downlink data to the mobile station UE at Step S1004, and sends an "SeNB change command" to the mobile station UE at Step S1005.

At Step S1006, the radio base station SeNB#1 notifies the radio base station SeNB#2 of downlink data (PDCP-PDU) the transmission of which to the mobile station UE is not completed using an "SN status transfer", and forwards the downlink data.

At Step S1007, in response to the "SeNB change command" at S1005, the mobile station UE sends the radio base station MeNB a "New data delivery request" that requests forwarding of new downlink data destined for the mobile station UE to the radio base station SeNB#2.

Here, the radio base station MeNB forwards, in response to the forwarding request, the new downlink data destined for the mobile station UE to the radio base station SeNB#2. Further, in an example of FIG. 3, the radio base station MeNB forwards PDCP-PDUs of sequence numbers "55" and later to the radio base station SeNB#2.

The mobile station UE performs an "RA procedure" with the radio base station SeNB#2 at Step S1008, and sends an "RRC connection reconfiguration complete" to the radio base station SeNB#2 at Step S1009 after the "RA procedure" is completed.

At Step S1010, the radio base station SeNB#2 starts, in response to the "RRC connection reconfiguration complete", scheduling of the downlink data destined for the mobile station UE forwarded by the radio base station SeNB#1.

Subsequent operations are similar to the operations (operations subsequent to a Path switch request) illustrated in FIG. 10.

Figure 4:
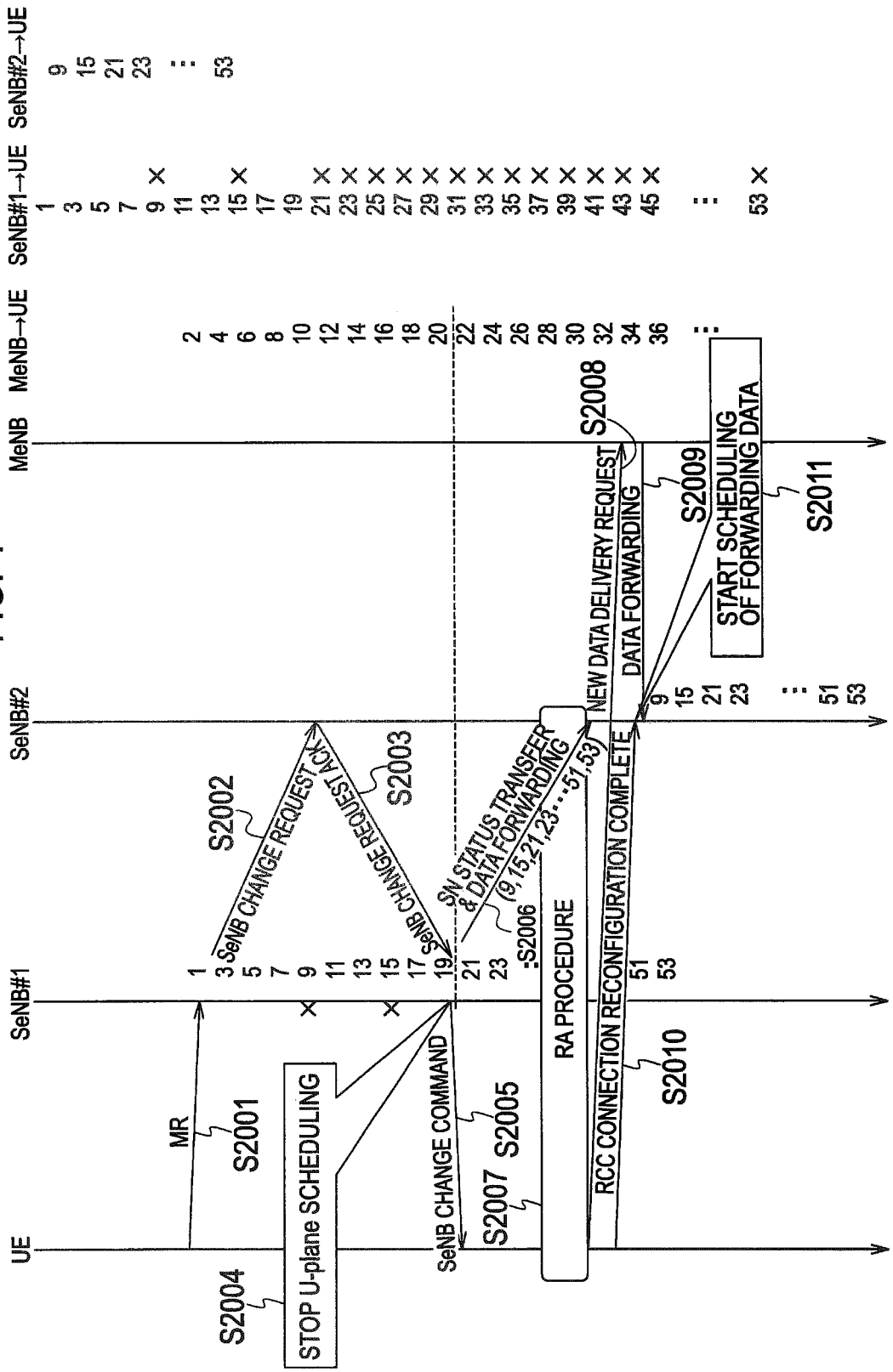
FIG. 4 is a sequence diagram illustrating an example of an operation (operation example 2) by the mobile communication system according to the first embodiment of the present invention.

Secondly, with reference to FIG. 4, an operation example 2 of the mobile communication system according to the present embodiment is described.

As illustrated in FIG. 4, the radio base station SeNB#1 receives a "Measurement Report" from the mobile station UE at Step S2001, and when determining to switch the radio base station SeNB from the radio base station SeNB#1 to the radio base station SeNB#2, sends the radio base station SeNB#2 an "SeNB change request" that requests switching of the radio base station SeNB at Step S2002.

Thereafter, upon receiving an "SeNB change request ack" from the radio base station SeNB#2 at Step S2003, the radio base station SeNB#1 stops scheduling of downlink data to the mobile station UE at Step S2004, and sends an "SeNB change command" to the mobile station UE at Step S2005.

At Step S2006, the radio base station SeNB#1 notifies the radio base station SeNB#2 of downlink data (PDCP-PDU) the transmission of which to the mobile station UE is not completed using an "SN status transfer", and forwards the downlink data.

The mobile station UE performs an "RA procedure" with the radio base station SeNB#2 at Step S2007, and after the "RA procedure" is completed, sends the radio base station MeNB a "New data delivery request" that requests forwarding of new downlink data destined for the mobile station UE to the radio base station SeNB#2 at Step S2008.

Moreover, the completion of the "RA procedure" may be assumed by the reception of an "RA response" or the completion of a "Contention resolution".

At Step S2009, the radio base station MeNB forwards, in response to the forwarding request, the new downlink data destined for the mobile station UE to the radio base station SeNB#2. Further, in an example of FIG. 4, the radio base station MeNB forwards PDCP-PDUs of sequence numbers "55" and later to the radio base station SeNB#2.

At Step S2010, the mobile station UE sends an "RRC connection reconfiguration complete" to the radio base station SeNB#2.

At Step S2011, the radio base station SeNB#2 starts, in response to the "RRC connection reconfiguration complete", scheduling of the downlink data destined for the mobile station UE forwarded by the radio base station SeNB#1.

Subsequent operations are similar to the operations (operations subsequent to the Path switch request) illustrated in FIG. 10.

Figure 5:
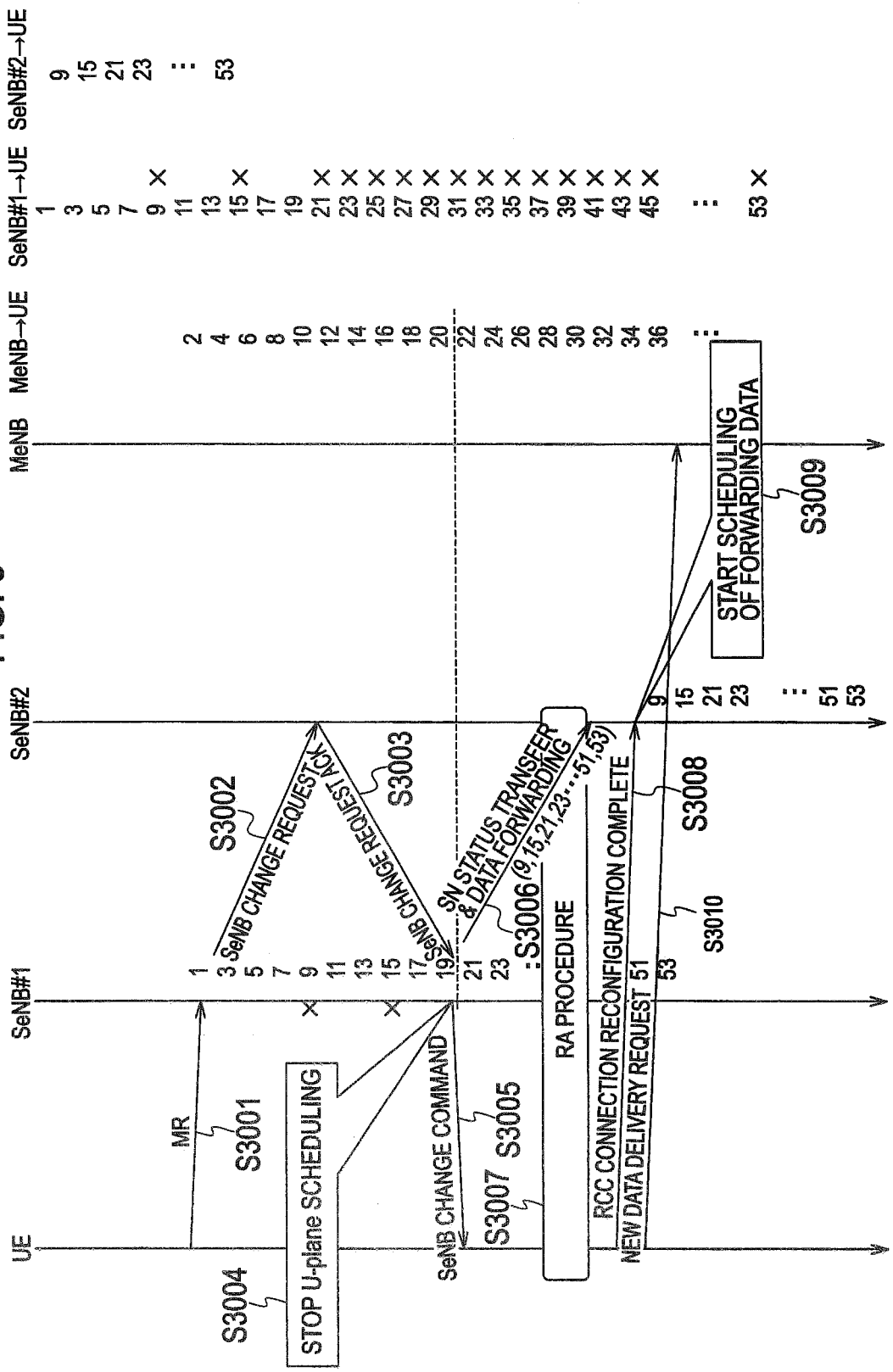
FIG. 5 is a sequence diagram illustrating an example of an operation (operation example 3) by the mobile communication system according to the first embodiment of the present invention.
Figure 6:
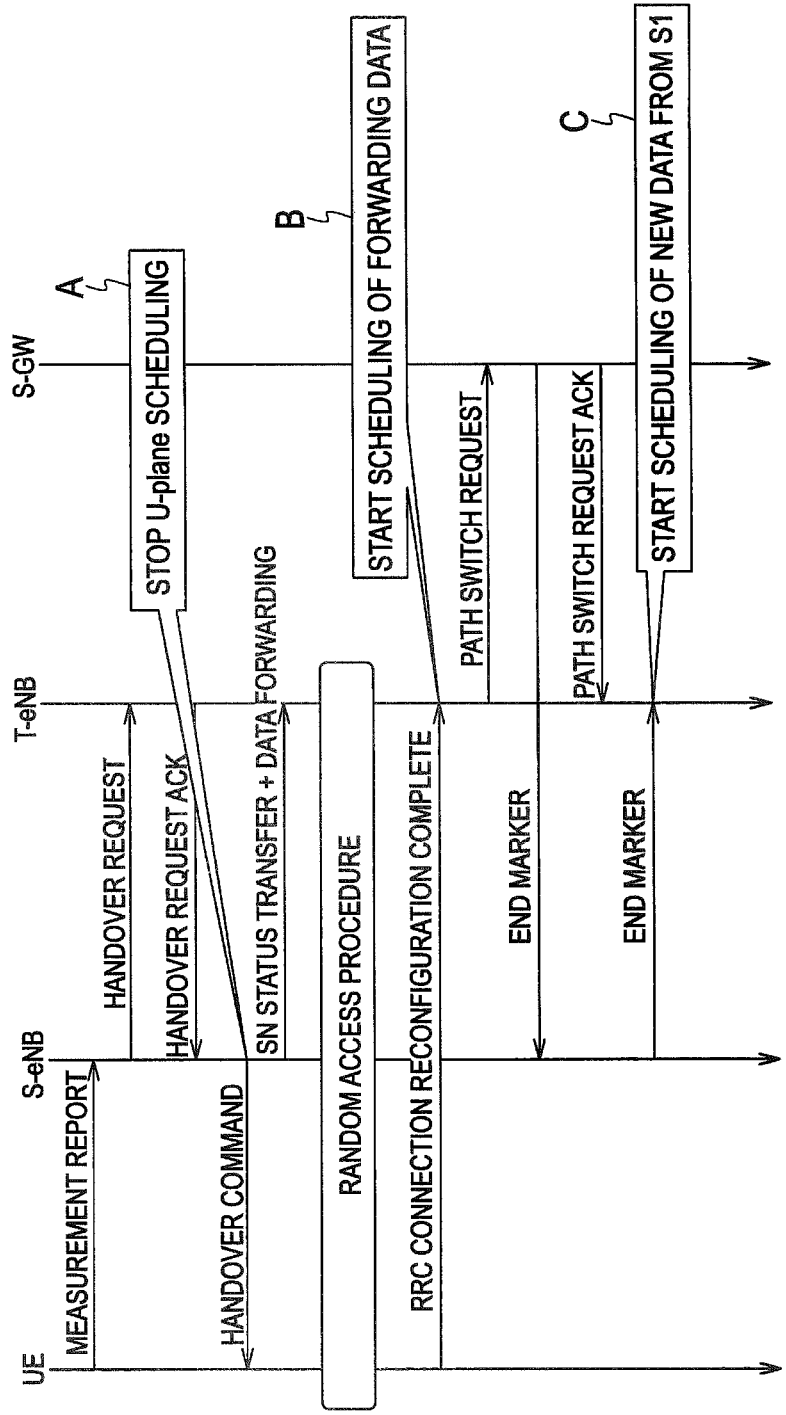
FIG. 6 is a diagram for explaining handover processing.
Figure 7:
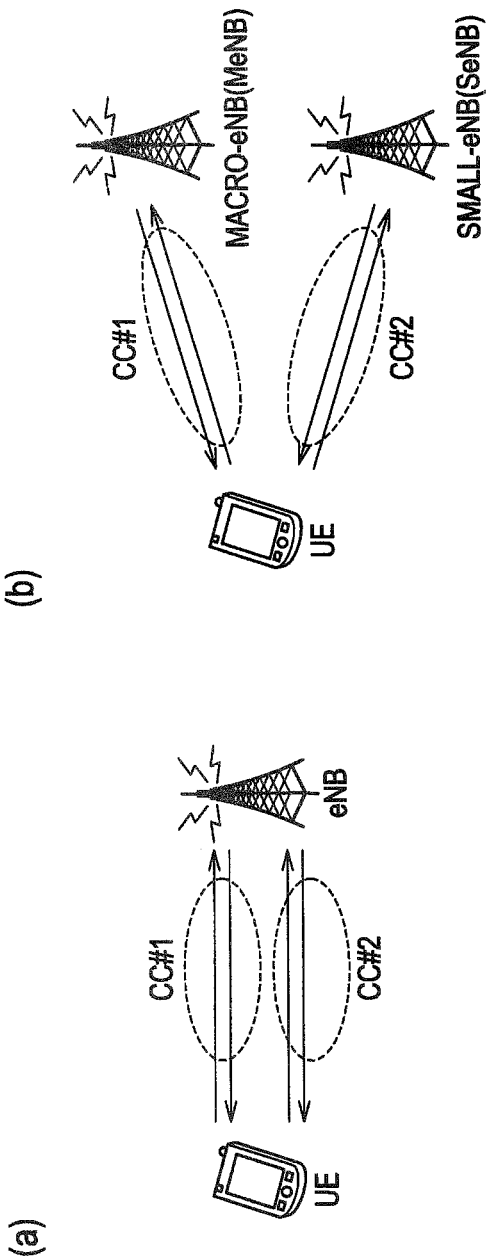
FIG. 7 is a diagram for explaining CA in Release-10 and an "Inter-node UP aggregation".
Figure 8:
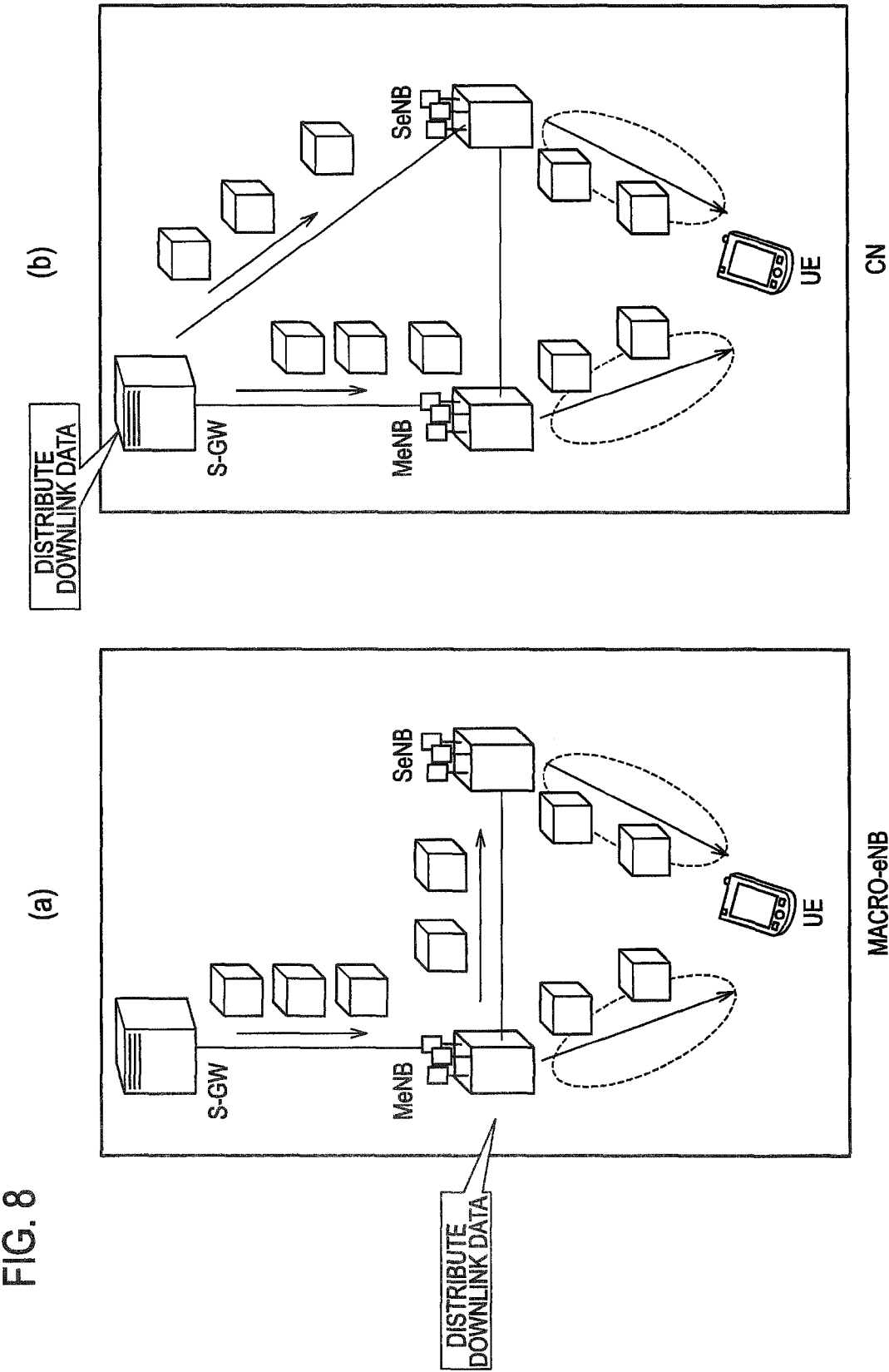
FIG. 8 is diagram for explaining distribution of downlink data in the "Inter-node UP aggregation".
Figure 9:
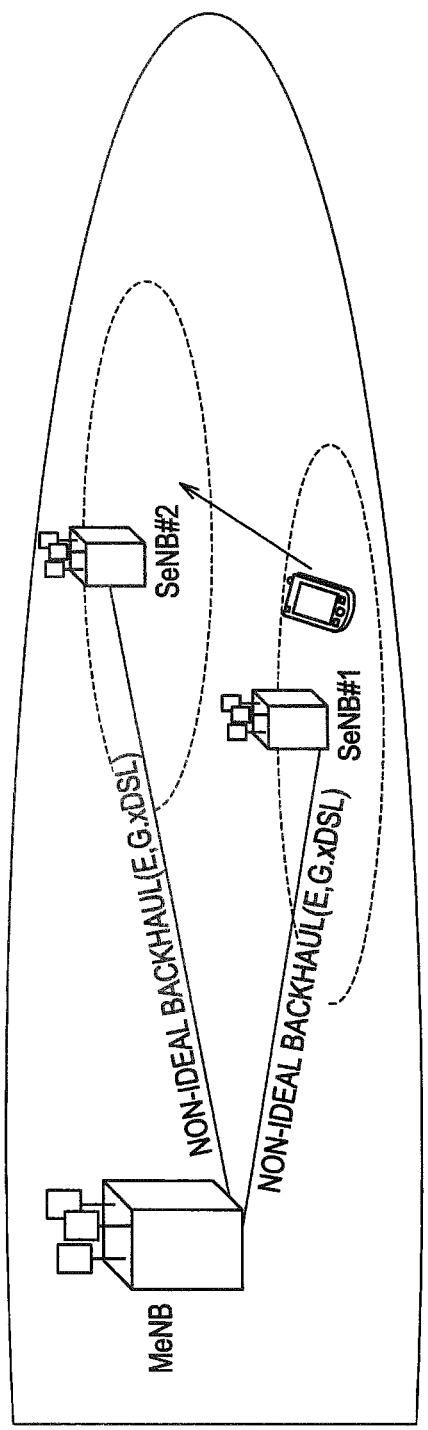
FIG. 9 is a diagram for explaining switching of a small-cell radio base station in the "Inter-node UP aggregation".

Thirdly, with reference to FIG. 5, an operation example 3 of the mobile communication system according to the present embodiment is described.

As illustrated in FIG. 5, the radio base station SeNB#1 receives a "Measurement Report" from the mobile station UE at Step S3001, and when determining to switch the radio base station SeNB from the radio base station SeNB#1 to the radio base station SeNB#2, sends the radio base station SeNB#2 an "SeNB change request" that requests switching of the radio base station SeNB at Step S3002.

Thereafter, upon receiving an "SeNB change request ack" from the radio base station SeNB#2 at Step S3003, the radio base station SeNB#1 stops scheduling of downlink data to the mobile station UE at Step S3004, and sends an "SeNB change command" to the mobile station UE at Step S3005.

At Step S3006, the radio base station SeNB#1 notifies the radio base station SeNB#2 of downlink data (PDCP-PDU) the transmission of which to the mobile station UE is not completed using an "SN status transfer", and forwards the downlink data.

The mobile station UE performs an "RA procedure" with the radio base station SeNB#2 at Step S3007, and after the "RA procedure" is completed or during the "RA procedure", sends an "RRC connection reconfiguration complete" to the radio base station SeNB#2 at Step S3008.

At Step S3009, the radio base station SeNB#2 starts, in response to the "RRC connection reconfiguration complete", scheduling of the downlink data destined for the mobile station UE forwarded by the radio base station SeNB#1.

At Step S3010, after the transmission of the "RRC connection reconfiguration complete" is completed, the mobile station UE sends the radio base station MeNB a "New data delivery request" that requests forwarding of new downlink data destined for the mobile station UE to the radio base station SeNB#2.

Further, the mobile station UE may send the above-described "New data delivery request" at a time point when the mobile station UE receiving an MAC-ACK or an RLC-ACK responding to the above-described "RRC connection reconfiguration complete" from the radio base station SeNB#2.

Subsequent operations are similar to the operations (operations subsequent to the Path switch request) illustrated in FIG. 10.

According to the mobile communication system according to the present embodiment, in switching a small-cell radio base station SeNB from the radio base station SeNB#1 to the other radio base station SeNB#2 in the "Inter-node UP aggregation", the macro-cell radio base station MeNB can forward new downlink data destined for the mobile station UE to the other radio base station SeNB#2 at a time point when the macro-cell radio base station MeNB receives a "New data delivery request" from the mobile station UE. This allows the forwarding of new downlink data destined for the mobile station UE from the radio base station MeNB to the other radio base station SeNB#2 to quickly start at a time point before the radio base station MeNB receives a "Path switch request" (see FIG. 10) from the other radio base station SeNB#2.

The features of the present embodiment may also be expressed as follows.

A first feature of the present embodiment is summarized as a mobile communication method to be executed when a mobile station UE performs CA (carrier aggregation) using a macro cell under a radio base station MeNB (macro-cell radio base station) and a small cell under a radio base station SeNB#1 (first small-cell radio base station), the method including: sending, by the radio base station SeNB#1, a radio base station SeNB#2 (second small-cell radio base station) an "SeNB change request (switching request)" that requests radio base station SeNB (small-cell radio base station) switching, when receiving a "Measurement Report (measurement report)" from the mobile station UE; stopping, by the first small-cell radio base, scheduling of downlink data destined for the mobile station UE, and sending the mobile station UE an "SeNB change command (switching instruction)" instructing the radio base station SeNB switching, when receiving an "SeNE change request ack (switching request response)" from the radio base station SeNB#2; sending, by the mobile station UE, the radio base station MeNB a "New data delivery request (forwarding request)" that requests forwarding of new downlink data destined for the mobile station UE to the radio base station SeNB#2, in response to the "SeNB change command"; and forwarding, by the radio base station MeNB, the new downlink data destined for the mobile station UE to the radio base station SeNB#2, in response to the "New data delivery request".

A second feature of the present embodiment is summarized as a mobile communication method to be executed when a mobile station UE performs CA using a macro cell under a radio base station MeNB and a small cell under a radio base station SeNB#1, the method including: sending, by the radio base station SeNB#1, a radio base station SeNB#2 an "SeNB change request" that requests radio base station SeNB switching, when receiving a "Measurement Report" from the mobile station UE; stopping, by the radio base station SeNB#1, scheduling of downlink data destined for the mobile station UE, and sending the mobile station UE an "SeNB change command" instructing the radio base station SeNB switching, when receiving an "SeNB change request ack" from the radio base station SeNB#2; performing, by the mobile station UE, a "RA procedure (random access procedure)" with the radio base station SeNB#2 in response to the "SeNB change command"; sendsing, by the mobile station UE, the radio base station MeNB a "New data delivery request" that requests forwarding of new downlink data destined for the mobile station UE to the radio base station SeNB#2, when the "RA procedure" is completed; and forwarding, by the radio base station MeNB the new downlink data destined for the mobile station UE to the radio base station SeNB#2, in response to the "New data delivery request".

A third feature of the present embodiment is summarized as a mobile communication method to be executed when a mobile station UE performs CA using a macro cell under a radio base station MeNB and a small cell under a radio base station SeNB#1, the method including: sending, by the radio base station SeNB#1, a radio base station SeNB#2 an "SeNB change request" that requests radio base station SeNE switching, when receiving a "Measurement Report" from the mobile station UE; stopping, by the radio base station SeNB#1, scheduling of downlink data destined for the mobile station UE, and sending the mobile station UE an "SeNB change command" instructing the radio base station SeNB switching, when receiving an "SeNB change request ack" from the radio base station SeNB#2; sending, by the mobile station UE, a "RRC connection reconfiguration complete (connection reconfiguration complete message)" to the radio base station SeNB#2, after receiving the "SeNB change command"; sending, by the mobile station UE, the radio base station MeNB a "New data delivery request" that requests forwarding of new downlink data destined for the mobile station UE to the radio base station SeNB#2, when completing the transmission of the "RRC connection reconfiguration complete"; and forwarding, by the radio base station MeNB, the new downlink data destined for the mobile station UE to the radio base station SeNB#2, in response to the "New data delivery request".

It should be noted that the foregoing operations of the mobile stations UE and the radio base stations MeNB, SeNB#1, and SeNB#2 may be implemented by hardware, may be implemented by a software module executed by a processor, or may be implemented in combination of the two.

The software module may be provided in a storage medium in any format, such as a RAM (Random Access Memory), a flash memory, a ROM (Read Only Memory), an EPROM (Erasable Programmable ROM), an EEPROM (Electronically Erasable and Programmable ROM), a register, a hard disk, a removable disk, or a CD-ROM.

The storage medium is connected to a processor so that the processor can read and write information from and to the storage medium. Instead, the storage medium may be integrated in a processor. The storage medium and the processor may be provided inside an ASIC. Such an ASIC may be provided in the mobile stations UE and the radio base stations MeNB, SeNB#1, and SeNB#2. Otherwise, the storage medium and the processor may be provided as discrete components inside the mobile stations UE and the radio base stations MeNB, SeNB#1, and SeNB#2.

Hereinabove, the present invention has been described in detail by use of the foregoing embodiments. However, it is apparent to those skilled in the art that the present invention should not be limited to the embodiments described in the specification. The present invention can be implemented as an altered or modified embodiment without departing from the spirit and scope of the present invention, which are determined by the description of the scope of claims. Therefore, the description of the specification is intended for illustrative explanation only and does not impose any limited interpretation on the present invention.

Note that the entire content of Japanese Patent Application No. 2013-170318 (filed on Aug. 20, 2013) is incorporated by reference in the present specification.

INDUSTRIAL APPLICABILITY

As described above, according to the present invention, it is possible to provide a mobile communication method capable of, in switching a small-cell radio base station SeNB from a radio base station SeNB#1 to another radio base station SeNB#2, quickly starting to forward new downlink data destined for a mobile station UE from a macro-cell radio base station MeNB to the other radio base station SeNB#2.

EXPLANATION OF THE REFERENCE

S-GW gateway device
MeNB, SeNB#1, SeNB#2 radio base station
UE mobile station
11 reception unit
12 transmission unit
13 CA management unit

The invention claimed is:

1. A mobile communication method to be executed when a mobile station performs carrier aggregation using a primary cell under a primary-cell radio base station and a secondary cell under a first secondary-cell radio base station, the method comprising:
sending, by the first secondary-cell radio base station, a second secondary-cell radio base station a switching request that requests secondary-cell radio base station switching, when receiving a measurement report from the mobile station;
stopping, by the first secondary-cell radio base, scheduling of downlink data destined for the mobile station, and sending the mobile station a switching instruction instructing the secondary-cell radio base station switching, when receiving a switching request response from the second secondary-cell radio base station;
sending, by the mobile station, the primary-cell radio base station a forwarding request that requests forwarding of new downlink data destined for the mobile station to the second secondary-cell radio base station, in response to the switching instruction; and forwarding, by the primary-cell radio base station, the new downlink data destined for the mobile station to the second secondary-cell radio base station, in response to the forwarding request.

2. A mobile communication method to be executed when a mobile station performs carrier aggregation using a primary cell under a primary-cell radio base station and a secondary cell under a first secondary-cell radio base station, the method comprising:

sending, by the first secondary-cell radio base station, a second secondary-cell radio base station a switching request that requests secondary-cell radio base station switching, when receiving a measurement report from the mobile station;

stopping, by the first secondary-cell radio base station, scheduling of downlink data destined for the mobile station, and sending the mobile station a switching instruction instructing the secondary-cell radio base station switching, when receiving a switching request response from the second secondary-cell radio base station;

performing, by the mobile station, a random access procedure with the second secondary-cell radio base station in response to the switching instruction;

sending, by the mobile station, the primary-cell radio base station a forwarding request that requests forwarding of new downlink data destined for the mobile station to the second secondary-cell radio base station, when the random access procedure is completed; and forwarding, by the primary-cell radio base station, the new downlink data destined for the mobile station to the second secondary-cell radio base station, in response to the forwarding request.

3. A mobile communication method to be executed when a mobile station performs carrier aggregation using a primary cell under a primary-cell radio base station and a secondary cell under a first secondary-cell radio base station, the method comprising:

sending, by the first secondary-cell radio base station, a second secondary-cell radio base station a switching request that requests secondary-cell radio base station switching, when receiving a measurement report from the mobile station;

stopping, by the first secondary-cell radio base station, scheduling of downlink data destined for the mobile station, and sending the mobile station a switching instruction instructing the secondary-cell radio base station switching, when receiving a switching request response from the second secondary-cell radio base station;

sending, by the mobile station, a connection reconfiguration complete message to the second secondary-cell radio base station, after receiving the switching instruction;

sending, by the mobile station, the primary-cell radio base station a forwarding request that requests forwarding of new downlink data destined for the mobile station to the second secondary-cell radio base station, when completing the transmission of the connection reconfiguration complete message; and forwarding, by the primary-cell radio base station, the new downlink data destined for the mobile station to the second secondary-cell radio base station, in response to the forwarding request.

* * * * *